United States Patent [19]

Jordan

[11] Patent Number: 5,251,939
[45] Date of Patent: Oct. 12, 1993

[54] WATER INJECTOR SYSTEM AND METHOD FOR USING SAME

[75] Inventor: Lawrence J. Jordan, Newton, Iowa

[73] Assignee: Maytag Corporation, Newton, Iowa

[21] Appl. No.: 732,809

[22] Filed: Jul. 19, 1991

[51] Int. Cl.[5] .......................................... F16L 35/00
[52] U.S. Cl. ...................................... 285/24; 285/87;
  285/154; 285/158; 285/209; 285/360; 285/423
[58] Field of Search ............... 285/158, 205, 209, 211,
  285/82, 153, 154, 243, 242, 24, 27, 376, 360,
  361; 137/216

[56] References Cited

U.S. PATENT DOCUMENTS

| | | | |
|---|---|---|---|
| 1,604,211 | 10/1926 | Williams | 285/27 |
| 2,922,526 | 1/1960 | Ohmann | 285/205 X |
| 3,394,725 | 7/1968 | Macoicz | 137/216.1 |
| 3,468,565 | 9/1969 | Roder | 285/360 X |
| 3,480,300 | 11/1969 | Jeffery et al. | 285/376 X |
| 3,650,551 | 3/1972 | Akers | 285/209 X |
| 3,717,168 | 2/1973 | Yake | 137/216.1 |
| 3,821,961 | 7/1974 | Schimke | 134/182 |
| 4,449,737 | 5/1984 | Specht | 285/209 X |
| 4,657,036 | 4/1987 | Yake | 134/95 |
| 4,890,866 | 1/1990 | Arp | 285/423 X |
| 5,083,583 | 1/1992 | Benjey | 285/361 X |
| 5,096,233 | 3/1992 | Diouhy | 285/154 |

Primary Examiner—Dave W. Arola
Attorney, Agent, or Firm—Zarley, McKee, Thomte, Voorhees & Sease

[57] ABSTRACT

A water injector system is provided for inter-connecting a water hose to a fill opening in the wall of a dishwasher tub. The injector includes an elongated body having a water ingress opening at the upper end and a water egress opening at the bottom end. A coupler having a plurality of lugs is provided at the lower end of the body and is adapted to cooperate with notches surrounding the fill opening of the dishwasher tub for connecting the injector to the tub and for holding the egress opening in communication with the fill opening of the tub. A ferrule is integrally provided on the upper end of the body for connection to a water hose to provide fluid communication from the hose through the injector into the fill opening of the water tub.

23 Claims, 5 Drawing Sheets

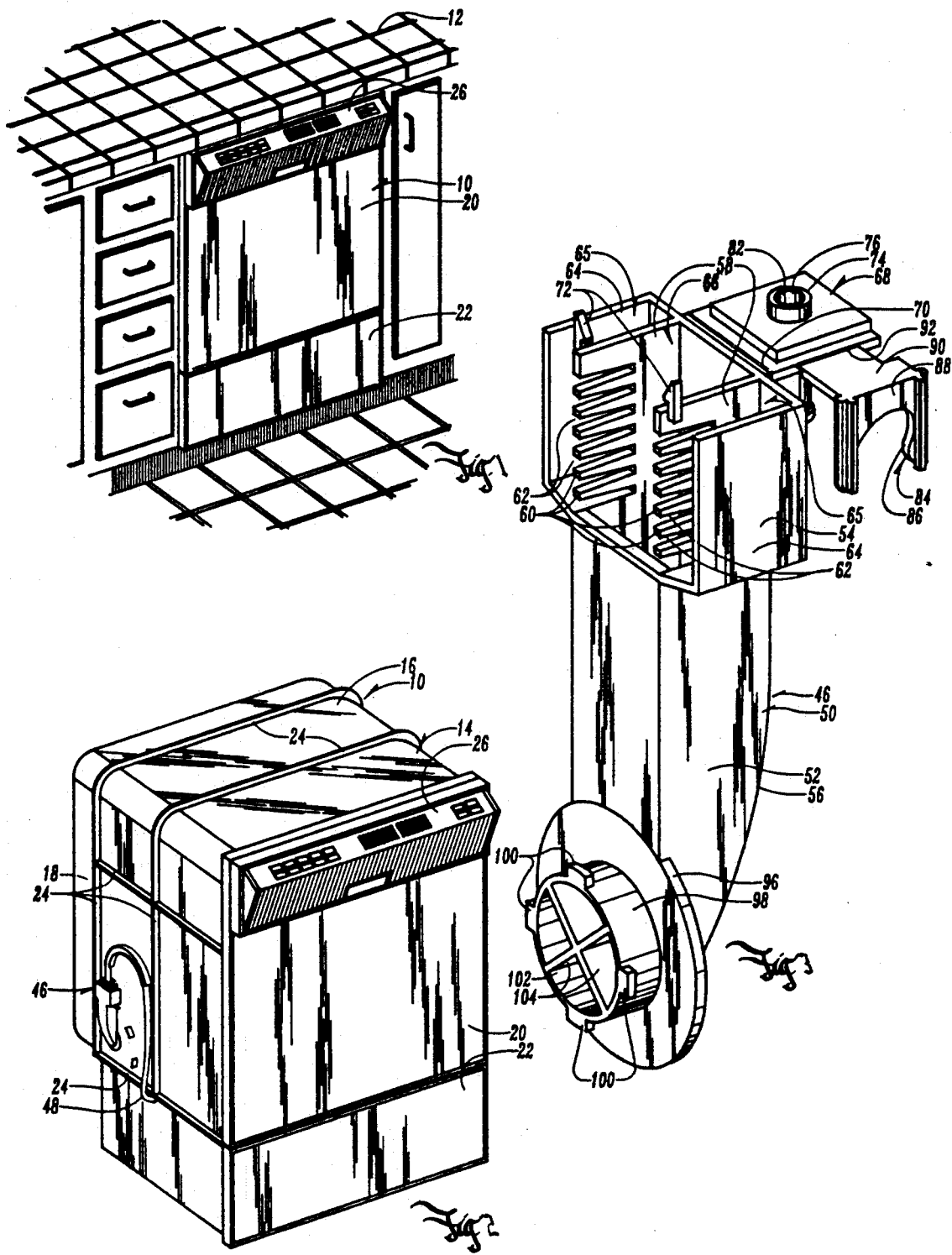

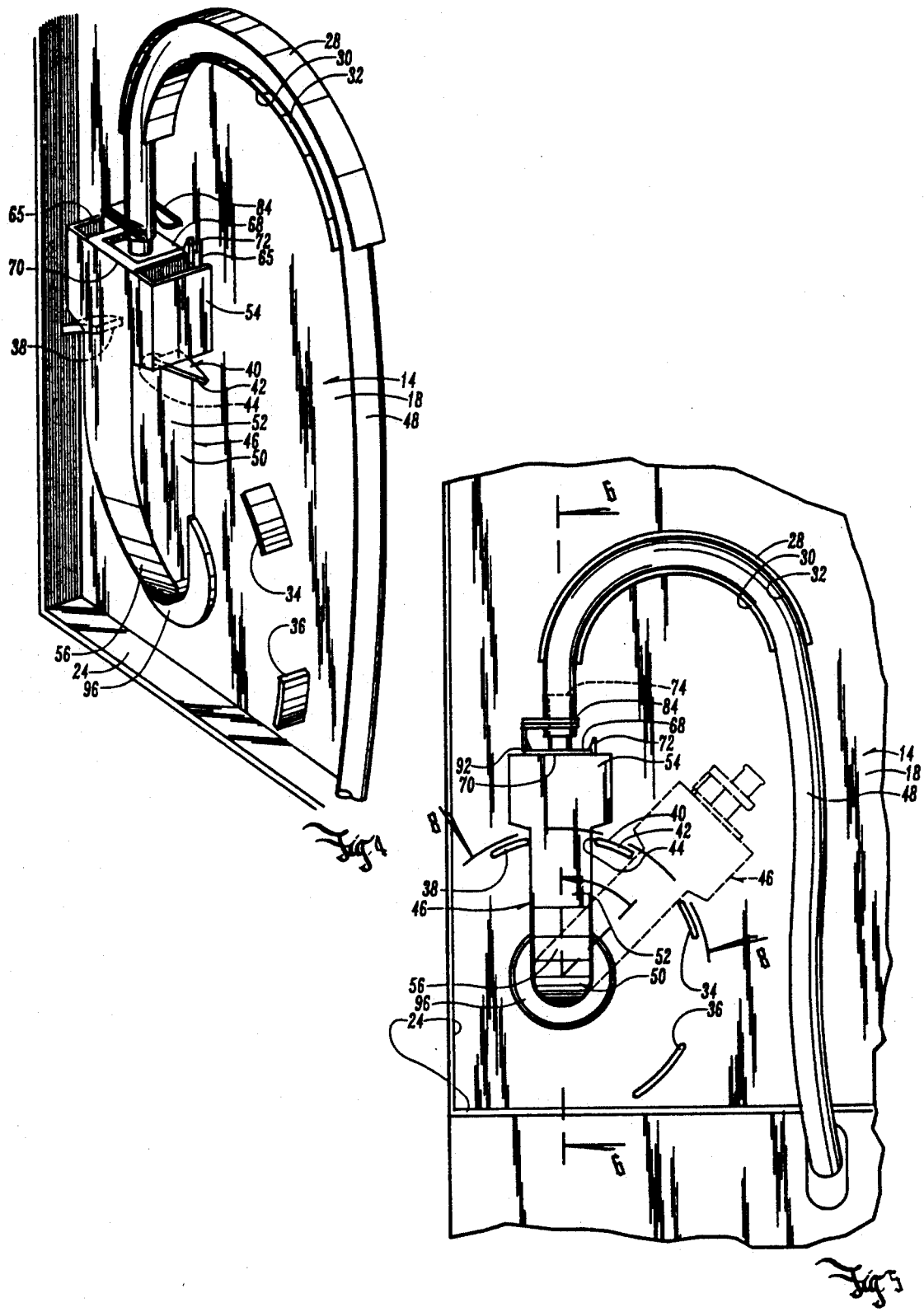

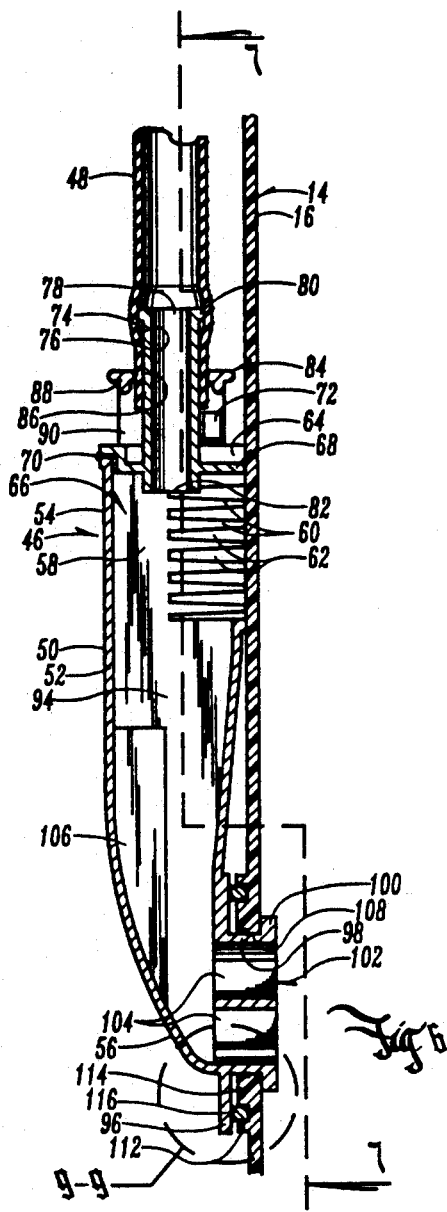
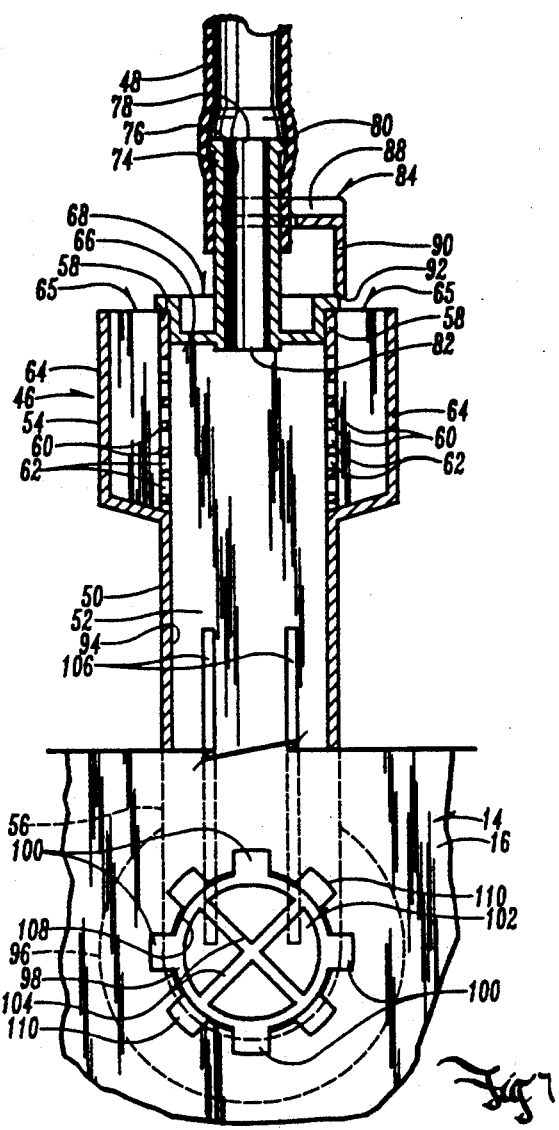
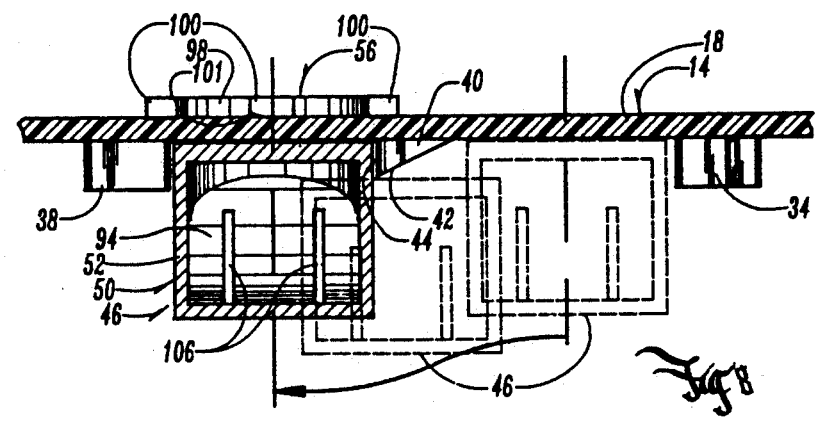

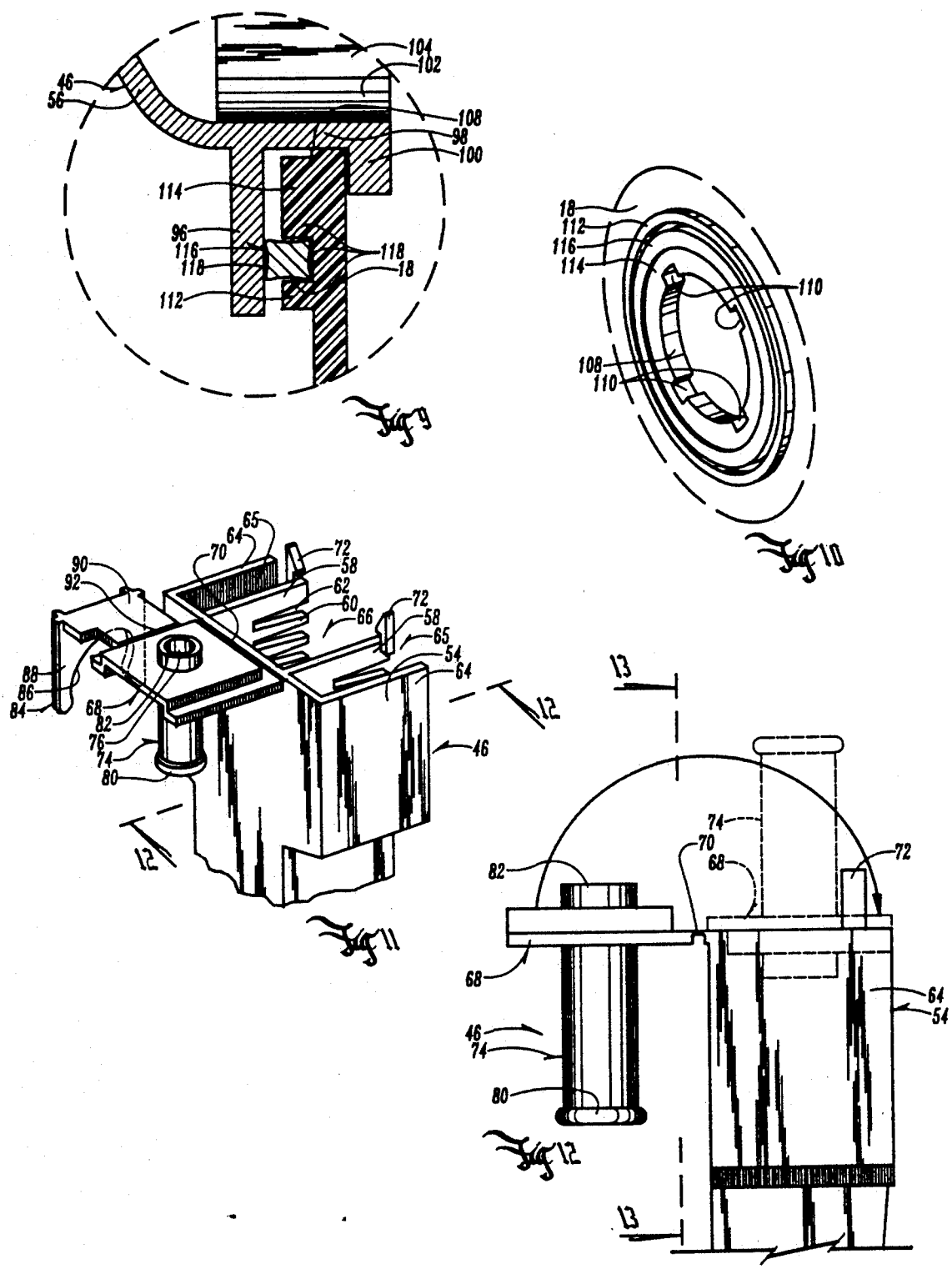

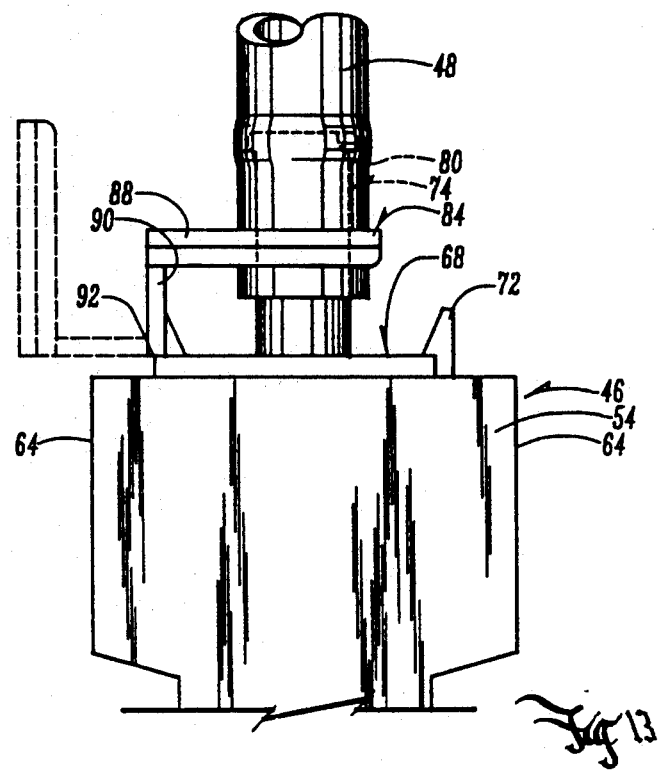
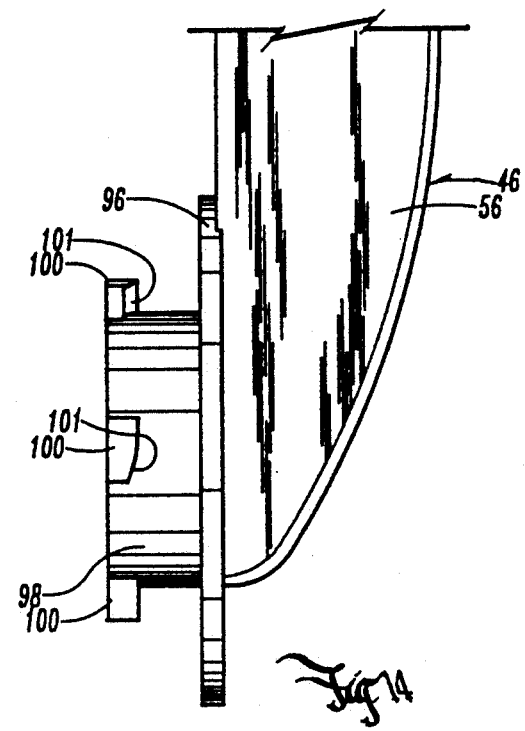

WATER INJECTOR SYSTEM AND METHOD FOR USING SAME

BACKGROUND OF THE INVENTION

This invention relates to a water injector system and method for using same, particularly for use with a dishwashing machine.

Dishwashing machines conventionally include a tub forming an interior washing chamber. The walls of the tub include a fill opening providing communication from the outside of the tub to the inside of the tub. A water injector is usually used to connect a water hose to the fill opening of the tub for injecting water into the interior of the tub.

Prior water injectors have been provided which include separate parts and pieces which must be assembled in order to attach the injector to the fill opening of the tub wall. These prior injectors often require screws or other means for securing the device in sealing relation over the fill opening.

Injectors have been provided which can be threaded into the fill opening, but it is necessary to turn these injectors several revolutions in order to attach them within the fill opening.

It is important that injectors incorporate in their structure some form of vacuum breaker so as to prevent back siphoning of the water from the dishwasher into the water supply system. Many of the vacuum breakers provided on prior art devices are complicated in structure.

While portions of prior injectors have been molded, there has not been any provision of an injector which is entirely of unitary construction and which can be molded in a single piece.

SUMMARY OF THE INVENTION

Therefore, a primary object of the present invention is the provision of an improved water injector system for a dishwasher and a method for using same.

A further object of the present invention is the provision of a water injector which can be molded in a single unitary construction.

A further object of the present invention is the provision of a water injector system which can be mounted to a dishwasher without the need for screws or other fastening means.

A further object of the present invention is the provision of a water injector system containing integral clamping means for clamping the water hose to the injector.

A further object of the present invention is the provision of an improved water injector system which includes a hinged top wall which can be moved from an open to a closed position.

A further object of the present invention is the provision of an improved water injector system which includes an integral vacuum breaker for preventing back siphoning of water from the dishwasher into the water hose.

A further object of present invention is the provision of an improved water injector system which can be secured to the fill opening of a dishwasher by inserting the injector into the fill opening and rotating the injector less than 360°.

A further object of the present invention is the provision of a water injector system which utilizes an injector made of plastic which combines with a plastic tub wall to permit the injector to flex outwardly adjacent its upper end relative to the tub wall.

A further object of the present invention is the provision of a water injector system which is economical to manufacture, durable in use, and efficient in operation.

The present invention achieves these objects with an injector system including a plastic molded injector which is adapted to be fitted within the fill opening in the side wall of the dishwasher tub. The dishwasher tub wall is made of plastic also.

The injector includes an elongated hollow body member having an elongated chamber therein. At the upper end of the body member is an ingress opening to the chamber, and at the lower end of the hollow member is a water egress opening. Adjacent the lower end of the body member is a coupler which comprises a shank adapted to be inserted into the fill opening of the tub wall. The shank includes a plurality of lugs on the outer periphery thereof which cooperate with complimentary notches around the fill opening of the tub wall.

At the upper end of the body member is a ferrule having a bore extending therethrough. At the lower end of the bore is an opening which provides the water ingress opening. The upper end of the ferrule is adapted to fit within the water hose and includes a rib thereon for facilitating the securement of the ferrule within the discharge end of the water hose.

A hinged locking clamp is integrally formed with the body member and is adapted to fold into retentive engagement with the discharge end of the water hose so as to securely clamp the water hose to the upper end of the ferrule.

The ferrule is integral with a folding door or wall adjacent the upper end of the body member. The door or wall is adapted to fold from a closed position in covering relation over the upper end of the body member to an open position exposing an upper opening providing communication into the chamber within the body member.

A pair of vacuum breaker vents are provided adjacent the upper end of the body member, and include openings in the body member providing communication from the chamber within the body member to the atmosphere. These openings prevent back siphoning of water upwardly into the water hose from the dishwasher tub.

Mounting of the injector to the tub wall is accomplished by inserting the shank of the coupler into the fill opening of the tub wall. A plurality of positioning ribs on the outside of the tub wall facilitate the proper rotational orientation of the injector and of the lugs on the coupler of the injector so that the shank will fit within the fill opening with the lugs of the coupler registered with a plurality of notches around the periphery of the fill opening. The injector is then rotated approximately one-eighth of a turn from an insertion position to an operable position. As the injector is rotated from the insertion position to the operable position, it encounters a cam surface on one of the positioning ribs which causes the device to flex outwardly away from the tub wall adjacent its upper end. This enables the injector to cam over the rib as it moves to its operable position. When the injector is in its operable position, the positioning ribs engage it and hold it against movement back to its removal position. In its operable position, the lower end of the injector is in sealed engagement with the fill opening of the tub wall and provides fluid communication into the interior of the tub.

The final step in mounting the injector is to place the water hose over the upper end of the ferrule. The folding clamp of the injector is then folded so as to retentively engage the water hose and hold the water hose tightly on the ferrule. This completes the mounting of the injector to the side of the tub so that the injector will provide fluid communication from the water hose through the fill opening in the wall of the tub into the interior of the tub.

The device can be removed quickly and easily merely by flexing the upper end of the injector outwardly around the positioning rib on the side of the tub wall and rotating the injector to its removal position. In that position the shank of the injector can be removed from the fill opening.

BRIEF DESCRIPTION OF FIGURES OF THE DRAWINGS

FIG. 1 is a perspective view of a dishwasher mounted beneath a counter.

FIG. 2 is a perspective view of the exterior of the dishwasher.

FIG. 3 is a perspective view of the water injector of the present invention.

FIG. 4 is a perspective detailed view showing the injector mounted to the exterior surface of the tub wall.

FIG. 5 is an elevational detailed view of the injector mounted on the side wall and showing the injector in its removable position in shadow lines.

FIG. 6 is a sectional view taken along line 6—6 of FIG. 5.

FIG. 7 is a sectional view taken along line 7—7 of FIG. 6.

FIG. 8 is a sectional view taken along line 8—8 of FIG. 5.

FIG. 9 is a detailed view taken along line 9—9 of FIG. 6.

FIG. 10 is a detailed perspective view of the fill opening in the tub wall of the present invention.

FIG. 11 is an enlarged perspective detailed view of the upper end of the injector.

FIG. 12 is an elevational view taken along line 12—12 of FIG. 11.

FIG. 13 is an elevational view taken along line 13—13 of FIG. 12, but showing the top door flap closed and showing the locking clamp engaging the water hose.

FIG. 14 is a side elevational detail of the lower end of the injector of the present invention.

DETAILED DESCRIPTION OF THE PREFERRED EMBODIMENT

Referring to FIGS. 1 and 2, a dishwasher 10 is shown mounted beneath a counter 12. Dishwasher 10 includes a tub 14 having a top wall 16, opposite side walls 18, a door 20, and a removable access panel 22. Extending around the outside surface of tub 14 are a plurality of ribs 24. Mounted on the upper edge of access door 20 is a control panel 26 having various controls for operating the dishwasher.

Side wall 18 of tub 14 includes a pair of spaced apart arcuate ribs 28, 30 (FIG. 4) which form a hose receiving channel 32. Also mounted on the side wall 18 are a plurality of guide ribs or fins 34, 36, 38, 40. Rib 40 includes a cam edge 42 and a stop edge 44.

Mounted to the outside surface of tub wall is a water injector generally designated by the numeral 46. A water hose 48 is connected to the water injector and is fitted within the curved channel 32 formed by arcuate ribs 28, 30. Water injector 46 includes an elongated body 50 having a central portion 52, an upper portion 54, and a lower portion 56. The upper portion 54 includes a pair of spaced apart interior side walls 58 which are formed by a plurality of spaced apart ribs 60 having spaces 62 extending therebetween. A pair of vent shields 64 are integral with the body member 50 and are in outward spaced relationship to the interior side walls 58. Air communication is provided from the space between interior side walls 58, through the spaces 62 between the ribs 60, and outwardly through open upper vent openings 65 adjacent the upper ends of vent shields 64. This provides a vacuum breaker for preventing back siphoning of water from the interior of the tub upwardly through the hose 48.

A top opening 66 is provided adjacent the upper end of body member 50. A top cap or door 68 is hinged to one of the edges of top opening 66 by means of a living hinge 70. Door 68 is movable from the open position shown in FIG. 3 to the closed position shown in FIG. 4, wherein it closes the top opening 66. A pair of latch fingers 72 formed integrally with the upper most ribs 60 provide a latching means for retentively holding the top cap or door 68 in its closed position. Latch fingers 72 can be yieldably moved outwardly away from one another to release the top cap 68 so that it can be folded about hinge 70 to its open position.

A conduit or ferrule 74 is integrally formed in the cap 68 and includes an elongated bore 76 (FIG. 6) extending therethrough. At the upper end of bore 76 is an upper opening 78 having an annular rib 80 extending therearound. At the lower end of ferrule bore 76 is a water ingress opening 82 which permits water to communicate to the interior of the body member 50.

A locking flap 84 is hinged to one edge of the top cap or door 68 and includes an arcuate notch 86 formed in a first flange 88 which is perpendicular to a second flange 90. Flange 90 is hinged to cap 68 for hinged movement about a living hinge 92.

The locking flap 84 is adapted to fold about hinge 92 from its position shown in FIG. 3 to its clamped position shown in FIG. 4, wherein the notch 86 surrounds the outer surface of water hose 48 and clamps the water hose in tight securement over the ferrule 74.

Within body member 50 is an elongated chamber 94 which is adapted to receive the water from the water hose 48. At the lower end of body member 50 is a circular sealing flange 96 having a cylindrical shank 98 projecting axially outwardly therefrom. Shank 98 includes a plurality of locking lugs 100 around its outer perimeter. Each of these locking lugs include a ramp portion 101 (FIG. 14). Shank 98 provides an egress opening 102 for fluid to pass from the interior of chamber 94 outwardly through shank 98. Within shank 98 are a plurality of deflection ribs 104, and within chamber 94 are an additional pair of interior deflecting ribs 106 (FIG. 6).

Cylindrical shank 98 is adapted to be matingly fitted within a fill opening 108 (FIG. 10) in the side wall 18 of tub 14. Fill opening 108 includes a plurality of locking notches 110 around its circumference. While four locking notches are shown, it is possible to use more or less without detracting from the invention. Extending around the fill opening 108 are first and second spaced apart annular ribs 112, 114 having an O-ring 116 fitted within the space therebetween. As can be seen in FIG. 9, the O-ring 116 is quad-shaped in configuration, and includes arcuate indentations 118 on its sides. These arcuate indentations 118 cause the four corners of the quad-shaped O-ring 116 to protrude slightly so as to provide four sealing surfaces for the cross-sectional shape of the O-ring. While a quad-shaped O-ring is shown, it is also possible to use O-rings of different cross-sectional configurations.

The water injector 46 is attached to the side wall 18 of tub 14 by inserting the cylindrical shank 98 within the fill opening 108 as shown in FIG. 6 and 9. In order to do this, it is necessary to orientate the injector 46 at the angle shown in shadow lines in FIG. 5. This permits the lugs 100 of the injector 46 to be registered with the notches 110 surrounding the fill opening 108. The various guide ribs 34, 36, 38, 40 facilitate the proper alignment of the injector 46 and the lugs 100 with the notches 110 of fill opening 108. Ribs 36 and walls 24 effectively block registry of logs 100 with notches 110 in any posture except between ribs 34 and 40 to insure proper orientation of the injector 46 on the side wall 18. From the insertion position shown in shadow lines in FIG. 5, the injector is rotated in a counter-clockwise direction to the vertical position or operable position shown in solid lines in FIG. 5. While moving from the insertion to the operable position, the injector encounters the cam surface 42 of guide rib 40, and this cam surface 42 causes the upper end of the injector to flex outwardly away from the wall 18 so that it can pass around rib 40. When it reaches its vertical position, it snaps back into facing engagement with wall 18 and is held against further rotation by the stop surface 44 of rib 40 and by the rib 38. In this position, the lugs 100 are misaligned with the notches 110 as can be seen in FIG. 7, thereby causing the lower end of the water injector 46 to be locked into the fill opening 108. The sealing ring 116 causes a sealing engagement between the circular sealing flange 96 and the outer surface of the annular ribs 112, 114.

The injector is formed from a plastic material and is molded into a unitary configuration. While various plastics may be used, the preferred plastics include a natural polypropylene manufactured by Himont under the product number 6524. Others which will work equally well include natural polypropylene products manufactured by Exxon under product number PP-1032 or by Amoco under product number 1046.

The tub 14 is also made of a plastic material. The preferred material is a polypropylene manufactured by Exxon under the product number MDK 312. The material is 20 percent talc filled.

No bolts or other securing means are needed to install injector 46. While the O-ring 116 is shown in the drawings, it is possible to eliminate O-ring 116 and to have flange 96 sealably engage the annular ribs 112, 114. The tight sealing of the flange 96 against the O-ring 116 is further accomplished by means of the ramp 101 (FIG. 14) which appears on the lugs 100. As the device is rotated from its insertion to its operable position, the ramp 100 cooperates with the interior surface of wall 18 to cause the shank to be pulled inwardly tightly within the fill opening 108 during the rotation of the injector from its insertion to its operable position.

The present invention provides an advantage over a threaded body or a nut attachment because less than a full turn of movement is required to securely attach the injector. Furthermore, the injector can be removed quickly and easily for replacement or repair. The hinged movement of the upper door 68 permits the door to be unfolded for easier attachment of the hose 48, and the hinged movement of the clamp 84 permits it to be quickly and easily clamped over the hose without the need for a separate clamp.

In the drawings and specification there has been set forth a preferred embodiment of the invention, and although specific terms are employed, these are used in a generic and descriptive sense only and not for purposes of limitation. Changes in the form and the proportion of parts as well as in the substitution of equivalents are contemplated as circumstances may suggest or render expedient without departing from the spirit or scope of the invention as further defined in the following claims.

I claim:

1. A water injector for interconnecting a water inlet hose to a fill opening in a wall of a dishwasher tub, said wall having an interior surface and an exterior surface; said water injector comprising:

an elongated hollow body member having first and second ends and forming an elongated chamber therein, said body member having a water ingress opening and a water egress opening adjacent said first and second ends respectively, and providing communication from outside said body member to said elongated chamber;

coupling means integral with said body member adjacent said egress opening for coupling said body member to said exterior surface of said tub wall with said egress opening in fluid communication with said fill opening in said tub wall;

conduit means having a hinged portion integrally formed with said body member and being sized to be connected to said water inlet hose, said conduit means being movable about said hinged portion into communication with said ingress opening of said body member for conducting water from said water inlet hose into said elongated chamber of said body member.

2. A water injector for interconnecting a water inlet hose to a fill opening in a wall of a dishwasher tub, said wall having an interior surface and an exterior surface; said water injector comprising:

an elongated hollow body member having first and second ends and forming an elongated chamber therein, said body member having a water ingress opening and a water egress opening adjacent said first and second ends respectively, and providing communication from outside said body member to said elongated chamber;

coupling means integral with said body member adjacent said egress opening for coupling said body member to said exterior surface of said tub wall with said egress opening in fluid communication with said fill opening in said tub wall;

conduit means integrally formed with said body member and having a movable portion positioned adjacent said ingress opening, said conduit means being sized to be connected to said water inlet hose, said conduit means being movable relative to said body member into fluid communication with said ingress opening of said body member for directing water from said water inlet hose into said elongated chamber of said body member;

said coupling means comprising a cylindrical shank surrounding said egress opening and sized to matingly fit within said fill opening of said tub, and a sealing flange surrounding said cylindrical shank and positioned to be sealed with said exterior surface of said tub wall whenever said cylindrical shank is within said fill opening;

said body member, said coupling means, and said conduit means being formed of plastic material molded into a single integral unit.

3. A water injector according to claim 1 or 2 wherein said body member includes a door opening adjacent said first end thereof, said movable portion of the conduit means including a door being integrally formed with said body member and being hinged thereto for hinged movement about a hinge axis from a closed position in covering relation over said door opening to an open position out of covering relation with said door opening, said water ingress opening and said conduit means extending through said door.

4. A water injector according to claim 3 wherein said body member includes movable latch means for detachably retentively engaging said door and holding said door in said closed position.

5. A water injector according to claims 1 or 2 wherein said body member includes vacuum breaker means for preventing back siphoning of water from said elongated chamber into said water hose.

6. A water injector according to claim 5 wherein said vacuum breaker means comprises at least one vent opening in said body member adjacent said ingress opening.

7. A water injector according to claim 6 wherein said body member includes a shield member in covering relation over said vent opening, said shield member being positioned to permit air communication from within said elongated chamber through said vent opening to the atmosphere.

8. A water injector according to claim 2 wherein said body member includes a door opening adjacent said first end thereof, said movable portion of said conduit means being a door movable from a closed position in covering relation over said door opening to an open position out of covering relation over said door opening, said water ingress opening and said conduit means extending through said door.

9. A water injector according to claim 2 wherein said movable portion of said conduit means comprises a hinged portion on the conduit means for movably connecting said conduit means to said body member for hinged movement between a first position wherein said conduit means is out of communication with said ingress opening of said body member to a second position wherein said conduit means is in communication with said ingress opening of said body member.

10. A water injector for interconnecting a water inlet hose to a fill opening in a wall of a dishwasher tub, said wall having an interior surface and an exterior surface; said water injector comprising:
an elongated hollow body member having first and second ends and forming an elongated chamber therein, said body member having a water ingress opening and a water egress opening adjacent said first and second ends respectively, and providing communication from outside said body member to said elongated chamber;
coupling means integral with said body member adjacent said egress opening for coupling said body member to said exterior surface of said tub wall with said egress opening in fluid communication with said fill opening in said tub wall;
conduit means integrally formed with said body member and having a movable portion positioned adjacent said ingress opening, said conduit means being sized to be connected to said water inlet hose, said conduit means being movable into general alignment with said ingress opening of said body member for directing water from said water inlet hose into said elongated chamber of said body member;
vacuum breaker means integral with said body member adjacent said ingress opening for preventing reverse siphoning of water from said elongated chamber through said conduit means;
said body member, said coupling means, said conduit means and said vacuum breaker means being formed from plastic material molded into a single integral unit.

11. A water injector according to claim 10 wherein said body member includes a door opening adjacent said first end thereof, said movable portion of the conduit means including a door being integrally formed with said body member and being hinged thereto for hinged movement about a hinge axis from a closed position in covering relation over said door opening to an open position out of covering relation with said door opening, said water ingress opening extending through said door and said conduit means being integrally formed therewith.

12. A water injector according to claim 11 wherein said body member includes movable latch means integral with said body member for detachably retentively engaging said door and holding said door in said closed position.

13. A water injector according to claim 10 wherein said vacuum breaker means comprises at least one vent opening in said body member adjacent said ingress opening.

14. A water injector according to claim 13 wherein said body member includes side walls adjacent said first end thereof, said vent opening extending through one of said side walls.

15. A water injector according to claim 14 wherein said body member includes shield means in spaced covering relation over said vent opening, said shield means being positioned to permit air communication from within said elongated chamber through said vent opening to the atmosphere.

16. In combination:
a water hose having a discharge end;
a dishwasher tub having at least one tub wall with a fill opening extending therethrough, said tub wall having an interior surface and an exterior surface;
an elongated hollow body member having first and second ends and forming an elongated hollow chamber therein, said body member having a water ingress opening and a water egress opening providing communication from outside said body member to said elongated chamber within said body member;
coupling means integral with said body member adjacent said egress opening and coupling said body member to said exterior surface of said tub wall with said egress opening in fluid communication with said fill opening in said tub wall, said coupling means permitting said body member to pivot with respect to said tub wall about an axis formed by said coupling means from an operable position to a removal position;

stop means on said exterior surface of said wall engaging said body member when said body member is in said operable position to hold said body member against movement from said operable to said removal position;

said body member being sufficiently flexible to permit said first end thereof to deflect away from said exterior surface of said tub wall and around said stop means so as to permit pivotal movement of said body member between said operable and removal positions;

conduit means integrally formed with said body and being connected to said discharge end of said water hose for receiving water therefrom, said conduit means being in fluid communication with said ingress opening of said body member for conducting water flow from said inlet hose to said elongated chamber of said body member.

17. A combination according to claim 16 wherein said stop member includes an abutment surface engaging a portion of said body member in said operable position to hold said body member against movement to said removal position.

18. A combination according to claim 15 wherein said body member is comprised of molded plastic.

19. A combination according to claim 18 wherein said tub wall is comprised of plastic.

20. A combination according to claim 17 wherein said stop member further includes a cam surface for engaging said body member and for causing said body member to cam outwardly away from said exterior surface of said tub wall and around said stop member when said body member is rotating from said removal position to said operable position.

21. A combination according to claim 16 wherein a plurality of positioning lugs extend outwardly from said exterior surface of said tub wall to facilitate aligning said coupling means in said removal position.

22. A combination according to claim 16 wherein said tub wall includes a first locking means adjacent said fill opening, said coupling means including a second locking means, said first and second locking means cooperating to couple said body member to said tub wall with said egress opening in fluid communication with said fill opening whenever said body member is in said operable position and said first and second locking means cooperating to permit removal of said egress opening from fluid communication with said fill opening whenever said body member is in said removal position.

23. A method for connecting a discharge end of a water hose to a fill opening in a tub wall of a dishwasher tub, said tub wall having an interior surface and an exterior surface and first locking means adjacent said fill opening, said method comprising:

taking an elongated hollow flexible body member having first and second ends and having an elongated hollow chamber therein, said body member having an ingress opening adjacent said first end and an egress opening adjacent said second end, and having conduit means in communication with said ingress and egress openings, said body member having coupling means adjacent said egress opening, said coupling means having a shank portion and second locking means;

inserting said shank portion of said coupling means axially into said fill opening of said tub wall while said coupling means is positioned in a first rotational orientation relative to said fill opening, whereby said first locking means and said second locking means cooperate to permit said shank portion to fit within said fill opening with said egress opening of said body member in fluid communication with said fill opening;

rotating said body member and said shank portion in unison so that said shank portion rotates within said fill opening from said first rotational orientation to a second rotational orientation wherein said first and second locking means cooperate to prevent removal of said shank portion axially from said fill opening and to hold said egress opening in sealed communication with said fill opening;

deflecting said body member outwardly away from exterior surface of said tub wall and around a stop member on said exterior surface of said wall during rotation of said body from said first rotational orientation to said second rotational orientation;

using said stop member to limit rotation of said body member from said second rotational orientation to said first rotational orientation when said body member is in said second rotational orientation;

connecting said water hose to said conduit means so as to provide fluid communication from said water hose to the interior of said elongated chamber.

* * * * *